United States Patent Office 3,480,557
Patented Nov. 25, 1969

3,480,557
SOLID STABILIZED HYDROGEN PEROXIDE COMPOSITIONS
Dimitry Alexis Shiraeff, Kutztown, Pa., assignor to GAF Corporation, New York, N.Y., a corporation of Delaware
No Drawing. Filed Jan. 30, 1967, Ser. No. 612,316
Int. Cl. C01b *15/02*
U.S. Cl. 252—186          5 Claims

ABSTRACT OF THE DISCLOSURE

A solid stabilized hydrogen peroxide composition comprising hydrogen peroxide and a stabilizing amount of a water-soluble polymeric N-vinyl heterocyclic compound which may be prepared by drying an aqueous solution of said components.

---

This invention is directed to solid, stabilized hydrogen peroxide compositions containing a stabilizing amount of a water-soluble polymeric N-vinyl heterocyclic compound, as well as to the method of producing stabilized compositions.

It is well known that hydrogen peroxide, even when present in an aqueous composition, is adversely effected by the presence of oxidizable impurities and catalytic agents and is, therefore, susceptible to deterioration or related degradation upon standing and storage. This is a serious disadvantage to industry, since such concentrates often must be stored for extended periods of time up to weeks or months. A number of stabilizers and deterioration inhibitors have been proposed for the purpose of preventing such deterioration. However, these known stabilizers or inhibitors vary in their effectiveness and by and large exhibit one or more disadvantages such as being expensive, failing to prevent effervescence, imparting undesirable color, or lacking sufficient solubility. Stabilized aqueous hydrogen peroxide solutions also have the disadvantage of losing their stability upon storage and decompose at high temperatures. Moreover, the risk of explosion and the hazards of breakage and spillage that are attendant to transportation further add to the disadvantage of such stabilized aqueous solutions.

It is an object of this invention to provide a stabilized hydrogen peroxide composition which is not subject to the above mentioned disadvantages. Another object of this invention is to provide a stabilized, solid hydrogen peroxide composition containing a stabilizing amount of a water-soluble polymeric N-vinyl heterocyclic compound, thereby extending the useful life span of hydrogen peroxide by providing stabilized solid compositions that may be safely shipped and stored at room or higher temperatures, and used as required either in solid form or dissolved in water. A further object of this invention is to provide methods for the manufacture of said stabilized compositions. Other objects and advantages of this invention will become apparent as this description proceeds.

The attainment of the above objects is made possible by the instant invention which is directed to novel and unobvious stabilized solid compositions comprising hydrogen peroxide and a stabilizing amount of a N-vinyl heterocyclic compound. I have made the surprising discovery that the instant stabilized, solid compositions may be formed by drying, e.g., evaporating an aqueous composition comprising $H_2O_2$ and a stabilizing amount of a polymeric N-vinyl heterocyclic compound to apparent dryness until a solid film or cake, which can be compounded into flakes or powder form, has been obtained. For example, initial aqueous hydrogen peroxide compositions containing said heterocyclic compound, when dried in shallow containers result in dry, brittle, transparent films, while stabilized hydrogen peroxide-polymeric heterocyclic cakes may be formed by using deeper containers. It is believed that complexes of polymeric N-vinyl heterocyclic compounds and hydrogen peroxide are formed upon drying the aqueous solutions of same, but I prefer not to be limited to any particular theory as to the manner or mode in which this invention may operate. While these complexes are solid, dry products, they are not necessarily anhydrous due to the hydrophilic nature of the polymeric N-vinyl heterocyclic compounds and amounts of moisture which do not affect the solid, dry characteristics of the complexes can be tolerated.

Water-soluble polymeric N-vinyl heterocyclic compounds which I have found useful in the practice of the present invention are illustrated by the following compounds: (a) polymeric N-vinyl lactams, i.e., polymeric organic ring compounds containing in their ring an acyl group

attached to a nitrogen atom, such as the polymers of N-vinyl pyrrolidone, preferably poly-N-vinyl-2-pyrrolidone, N-vinyl-2-piperidone and N-vinyl-2-caprolactam, polymeric N-vinyl-2-oxazolidones, polymeric N-vinyl-3-morpholinones; (b) polymeric N-vinyl-imidazoles and water-soluble copolymers including graft copolymers prepared from the above N-vinyl-heterocyclic and dissimilar vinyl monomers such as vinyl acetate, isopropenyl acetate, vinyl laurate, vinyl stearate, vinyl oleate, vinyl benzoate, vinyl chloride, 2-chloro propene, methyl vinyl ether, ethyl vinyl ether, isopropyl vinyl ether, isobutyl vinyl ether, 2-oxethyl vinyl ether, phenyl vinyl ether, methyl acrylate, ethyl acrylate, methyl methacrylate, 2-ethylhexyl acrylate, hexyl acrylate, styrene, methoxystyrene, ethylstyrene, chlorostyrene or the like.

N-vinyl heterocyclic compounds of the type described above and their polymers are well known in the art and methods for their production may be found in patents and other literature. For example, U.S. Patent 2,317,804 discloses a suitable method for preparing N-vinyl lactams. U.S. Patent 2,265,450 and 2,335,454 disclose methods for preparing water-soluble polymers of N-vinyl lactams and their solutions. A method for the preparation of polymeric N-vinyl-2-oxazolidone is given in U.S. Patent 2,987,505.

Homopolymers, random type copolymers and graft copolymers of the above described types having molecular weights from about 1,000 to 500,000 are preferred in the practice of this invention. Generally, I prefer to use polyvinylpyrrolidone having molecular weights of from about 300,000 to 400,000. These preferred polyvinyl pyrrolidone compounds may also be defined in terms of their Fikentscher K values and include polyvinyl pyrrolidone having Fikentscher K value ranging from 15 to 100.

For some applications it may be advantageous to use mixtures of the above described polymeric materials having different molecular weight ranges.

When copolymers are used, the weight ratio of the component N-vinyl heterocyclic monomer to that of the dissimilar vinyl monomer in the copolymer will determine its properties. Choice of the weight ratio will depend on the particular properties desired in the copolymer. Preferred weight ratios of N-vinyl heterocyclic monomer to dissimilar vinyl monomers include ratios from 40:60 upward.

The amount of hydrogen peroxide present in the aqueous hydrogen peroxide solutions, that are to be dried in order to obtain the instant solid compositions, has not been found to be critical, since weak solutions of hydrogen peroxide, as well as strong solutions of hydrogen peroxide have been effectively utilized. A proportion of hydrogen peroxide is retained in the instant stabilized compositions, i.e., film or cakes obtained upon drying the aqueous hydrogen peroxide solutions containing a water-soluble polymeric N-vinyl heterocyclic compound. This proportion of retained hydrogen peroxide appears to vary with the concentration of hydrogen peroxide in the relation to the heterocyclic compound and with the total volume of the solution. For example, when 30% or 50% hydrogen peroxide aqueous solutions, containing the polyvinyl heterocyclic compound, were dried in shallow containers, dry, brittle, transparent films which gave on titration from about 10 to 20% hydrogen peroxide based on the film weight were produced. Using deeper containers, cakes have been formed which have been found to contain about 25 to 35% hydrogen peroxide by titration. It is preferred that sufficient hydrogen peroxide be present before drying so as to obtain a solid composition containing at least about 2% and preferably about 4.5 to 70% by weight of $H_2O_2$ based on the weight of the polymeric compound present in the final product.

The amount of water-soluble polymeric N-vinyl heterocyclic preservatives added to the aqueous hydrogen peroxide solutions is also not critical, the only requirement being that sufficient amounts be added so that the hydrogen peroxide in the solid composition is stabilized. It is obvious that the amount added will vary with the heterocyclic compound, the amount of hydrogen peroxide in the aqueous solution, as well as the particular use desired of the stabilized composition. However, it is preferred to use at least 1 part by weight of heterocyclic compound per 10 parts by weight of hydrogen peroxide.

The instant solid compositions, which may be re-dissolved readily in water, are not only stable under room temperature storage, but even when heated at a 100° C. for 30 hours in an electric oven, have been found to still retain slightly over 2% hydrogen peroxide. The retention of hydrogen peroxide in these films or cakes, the slight rise in temperature (about 45° to 50° C.) during the dissolution of heterocyclic compound in hydrogen peroxide and the absence of frothing by drying of these solutions would seem to indicate there is a formation of some loose compound between the heterocyclic compound and hydrogen peroxide, depending perhaps, on the interplay of the residual valence forces. However, this is merely an explanation by way of theory and it is understood that applicant does not intend to be limited by the manner or mode in which this invention may operate.

The manner in which the aqueous hydrogen peroxide compositions are formed is not critical, since the components may be added in any manner. For instance, the solid polymeric N-vinyl heterocyclic compound may be mixed with 100% $H_2O_2$ or dissolved in an aqueous solution of the hydrogen peroxide or alternatively 100% hydrogen peroxide may be added to an aqueous solution of the heterocyclic compound or aqueous solutions of both components may be mixed together. As stated above, the preparation of the instant, stable, solid hydrogen peroxide-poly-N-vinyl heterocyclic compositions may be carried out by drying the aqueous counterpart compositions. While the presence of water is technically not essential in the formation of the instant solid compositions, due to the danger and hazards of fire and explosion accompanied with the handling of pure hydrogen peroxide, the use of intermediate aqueous solutions is definitely preferred. The method of drying is immaterial and essentially any means of vaporizing or evaporating the water may be employed, the only requirement being that care must be taken to see that the desired dry compositions are not destroyed. Thus, heating in trays in a drying oven, evaporation on a steam bath, and drum drying either at atmospheric pressure or under vacuum have been found to be effective. Spray drying may be used, if desired.

The instant stabilized, solid compositions have a wide range of utility in both the commercial and industrial fields. For example, they may form the basis of washing concentrates, bleaching agents, disinfecting agents, sterilization agents, etching agents and cosmetic agents. Moreover, they may be utilized in various bleaching operations, such as the bleaching of wool and human hair or they may be used as clarification agents for beverages such as beer, whiskey, wine and other alcoholic and fermented beverages. In addition, such compositions may be used to provide a source of oxygen which can be released at a controlled rate for sterilization and may be applied directly to wounds or form the basis of a permanently antiseptic material by first spraying its aqueous counterpart on bandages and gauze and then allowing said materials to dry. Moreover, the instant stabilized compositions may be used as catalysts in, in situ, polymerizations requiring a free radical source. It is, therefore, apparent that the present stabilized compositions may be formulated with the usual additives, for example, pH modifiers, detergents, sunscreen agents, emollients, brighteners and the like, depending on the particular use contemplated.

The following examples are illustrative of the present invention and are not to be regarded as limitative. It is to be understood that all parts, percentages and proportions referred to herein and in the appended claims are by weight unless otherwise indicated.

EXAMPLE I

Solid stabilized hydrogen peroxide-polyvinyl pyrrolidone compositions were prepared by the following procedure: Various weights of poly-N-vinyl pyrrolidone K-90, obtained by the polymerization of N-vinyl-2-pyrrolidone, were placed into a set of evaporating dishes and aqueous hydrogen peroxide (30% hydrogen peroxide) was added to each dish in an amount to give 20% hydrogen peroxide based on the weight of polyvinyl pyrrolidone present. The volume of each dish was then brought to 100 ml. with water. After preparing the aqueous hydrogen peroxide solutions the dishes were placed on a water bath and the solutions were evaporated to dryness to form solid stabilized hydrogen peroxide-polyvinyl pyrrolidone compositions. The amount of hydrogen peroxide content in said solid compositions was evaluated by dissolving the residues in water and titrating to determine the hydrogen peroxide content. The data obtained is shown in the following table:

|  | Dish | | | |
|---|---|---|---|---|
|  | #1 | #2 | #3 | #4 |
| Solution: | | | | |
| Volume, ml | 100 | 100 | 100 | 100 |
| $H_2O_2$ gm | 0.398 | 0.596 | 0.795 | 0.994 |
| PVP | 2.0000 | 3.0000 | 4.0000 | 5.0000 |
| Solid Residue: | | | | |
| $H_2O_2$, gm | 0.0940 | 0.1314 | 0.1950 | 0.2200 |
| Percent $H_2O_2$ based on the weight of PVP | 4.70 | 4.38 | 4.88 | 4.40 |

EXAMPLE II

Additional stabilized solid compositions were prepared by following the procedure of Example I, only this time 20 ml. of aqueous hydrogen peroxide (30% hydrogen peroxide) were added to each set of evaporating dishes containing a polyvinyl pyrrolidone preservative followed by the addition of 80 ml. of water in order to demonstrate the amount of hydrogen peroxide retained in the solid stabilized compositions which resulted from evaporating the 6% hydrogen peroxide solutions to dryness. The hydrogen peroxide content retained was determined by the same titration procedure and is reported as follows:

A

|  | Dish | | | |
|---|---|---|---|---|
|  | #1 | #2 | #3 | #4 |
| Solution: | | | | |
| Volume, ml | 100 | 100 | 100 | 100 |
| $H_2O_2$, gm | 6 | 6 | 6 | 6 |
| PVP gm | 2.0000 | 3.0000 | 4.0000 | 5.0000 |
| Solid Residue: | | | | |
| $H_2O_2$, gm | 0.3500 | 0.5750 | 0.7675 | 0.9725 |
| Percent $H_2O_2$ based on the weight of PVP | 17.50 | 19.17 | 19.19 | 19.45 |

B

|  | Dish | | | |
|---|---|---|---|---|
|  | #5 | #6 | #7 | #8 |
| Solution: | | | | |
| Volume, ml | 100 | 100 | 100 | 100 |
| $H_2O_2$, gm | 6 | 6 | 6 | 6 |
| PVP gm | 2.0000 | 3.0000 | 4.0000 | 5.0000 |
| Solid Residue: | | | | |
| $H_2O_2$, gm | 0.3380 | 0.5300 | 0.7100 | 0.9620 |
| Percent $H_2O_2$ based on the weight of PVP | 16.90 | 17.65 | 17.75 | 19.24 |

EXAMPLE III

In order to demonstrate the various solid stabilized hydrogen peroxide-polyvinyl pyrrolidone compositions that may be prepared by evaporating aqueous compositions, which contain the same weights of polyvinyl pyrrolidone and hydrogen peroxide but in different volumetric solutions, the following procedure was carried out: Into each of 5 evaporating dishes 3.0 grams of poly-N-vinyl pyrrolidone K–90 were added, then 10.0 ml. of aqueous hydrogen peroxide (30% $H_2O_2$) were added followed by enough water to make the volumes in these dishes 50, 100, 150, 200 and 500 ml. The dishes were then placed on a water bath and the solutions evaporated to dryness. The hydrogen peroxide content in the solid stabilized composition was obtained by dissolving the solid residues in water and titrating for the $H_2O_2$ content. The results were reported as follows:

|  | Dish | | | | |
|---|---|---|---|---|---|
|  | #1 | #2 | #3 | #4 | #5 |
| Solution: | | | | | |
| Volume, ml | 50.0 | 100.00 | 150.0 | 200.0 | 500.0 |
| $H_2O_2$, gm | 3 | 3 | 3 | 3 | 3 |
| PVP gm | 3 | 3 | 3 | 3 | 3 |
| Solid Residue: | | | | | |
| $H_2O_2$, gm | 0.4350 | 0.4350 | 0.5290 | 0.5450 | 0.4350 |
| Percent $H_2O_2$ based on the weight of PVP | 14.5 | 16.4 | 17.6 | 18.2 | 14.5 |

EXAMPLE IV

A solid stabilized hydrogen peroxide polyvinyl pyrrolidone composition was prepared by dissolving 100 g. polyvinyl pyrrolidone K–90 in a 300 ml. aqueous solution of hydrogen peroxide (50% $H_2O_2$) with stirring until a completely homogenous solution was obtained. The solution was then poured onto a sheet of aluminum foil (Teflon may be used if desired) to a depth of about 3 mm. thickness. This preparation was then allowed to air dry for 6 to 7 days at which time the water and excess hydrogen peroxide had evaporated leaving a thin brittle film of polyvinyl pyrrolidone K–90 containing hydrogen peroxide. The film was then peeled away from the foil and ground into small chips in a blender. The final product was found to contain 9.7% hydrogen peroxide.

EXAMPLE V

Additional solid stabilized hydrogen peroxide-polyvinyl pyrrolidone compositions were prepared by following the procedure of Example III utilizing different amounts of the various components. The following table illustrates the various stabilized compositions which were prepared:

| $H_2O_2$ measured | PVP weighed | Percent $H_2O_2$ to PVP | Solid Product | Percent $H_2O_2$ in Dry Product |
|---|---|---|---|---|
| 10 ml., 30% $H_2O_2$ | 20 gm., K–90 | 16 | Translucent film | 10.6 |
| 50 ml. 30% $H_2O_2$ | 50 gm., K–90 | 32 | Cake | 19.45 |
| 30 ml., 50% $H_2O_2$ | 25 gm., K–90 | 62 | Translucent film | 20.7 |
| 50 ml., 50% $H_2O_2$ | 50 gm., K–90 | 60 | Cake | 32.26 |
| Do | 25 gm., K–90 | 120 | do | 35.20 |
| 50 ml., 30% $H_2O_2$ | 50 gm., K–30 | 32 | Transparent film | 14.32 |
| 50 ml., 50% $H_2O_2$ | do | 60 | do | 11.26 |

EXAMPLE VI

In order to demonstrate the stability of the instant solid stabilized hydrogen peroxide polyvinyl pyrrolidone compositions to storage at room temperature, two different compositions were allowed to stand for 2 months. The following table illustrates the amount of hydrogen peroxide present in each stabilized composition as recorded after 1 month and again after 2 months storage and demonstrates the excellent stability of the instant compositions.

| Sample | Original $H_2O_2$ content, percent | After 1 month, percent | After 2 months, percent |
|---|---|---|---|
| Translucent Film obtained by drying at R.T. a solution of 20 gm. PVP K–90 in 10 ml. 30% $H_2O_2$ | 10.6 | 10.31 | 10.17 |
| Cake obtained by drying at R.T. a solution of 50 gm. PVP K–90 in 50 ml. 50% $H_2O_2$ | 32.26 | 29.88 | 27.76 |

EXAMPLE VII

To further demonstrate the excellent stability of the instant solid stabilized compositions, a stabilized composition was obtained by dissolving 50 g. of poly-N-vinyl pyrrolidone K–30 in 50 ml. of aqueous hydrogen peroxide (30% $H_2O_2$) and allowing the aqueous solution to dry on an aluminum foil tray until it became hard and brittle. The film obtained was then heated at a 100° C. in an electric oven for a number of hours, while the amount of hydrogen peroxide content in the film was recorded at different intervals of time. The following table demonstrates the excellent stability of the instant solid stabilized composition when exposed to high temperatures:

| Original $H_2O_2$ content prior to heating, percent | $H_2O_2$ Content of Film heated in oven at 100° C. for— | | | | | |
|---|---|---|---|---|---|---|
| | 1 hr., percent | 2 hrs., percent | 3 hrs., percent | 5 hrs., percent | 30 hrs., percent | 175 hrs., percent |
| 14.23 | 9.39 | 5.85 | 5.08 | 5.29 | 2.32 | 0.33 |

EXAMPLE VIII

The drying time required to form solid stabilized hydrogen peroxide-polyvinyl pyrrolidone compositions may be materially shortened by the addition of an alcoholic solvent to the starting compositions.

A series of solid stabilized hydrogen peroxide-polyvinyl pyrrolidone compositions were prepared by the following procedure:

35 g. of PVP(K–90) were dissolved in 125 ml. of aqueous hydrogen peroxide-methanol solution with stirring until a completely homogenous solution was obtained. The concentrations of 50% $H_2O_2$ and methanol were varied while maintaining a constant volume of 125 ml. of aqueous hydrogen peroxide-methanol solution. The preparation was then poured into a Teflon coated cake pan (9" x 9") and placed on the steam bath until a hard, brittle film of PVP (K–90)/$H_2O_2$ was formed. The sample was removed from the cake pan and ground into small chips with a blender and the percent of hydrogen peroxide in the solid composition evaluated. The data obtained is shown in the following table:

| | $CH_3OH$, ml. | PVP (K–90) gms. | Drying Time In Hours | Percent $H_2O_2$ in PVP (K–90) $H_2O_2$ |
|---|---|---|---|---|
| 50% $H_2O_2$, ml.: | | | | |
| 5 | 120 | 35 | 1½ | 5.71 |
| 10 | 115 | 35 | 1¾ | 7.00 |
| 12 | 113 | 35 | 1¾ | 9.56 |
| 15 | 110 | 35 | 1¾ | 10.00 |
| 30 | 95 | 35 | 2 | 10.04 |
| 50 | 75 | 35 | 2 | 10.73 |
| 75 | 50 | 35 | 5 | 12.30 |
| 100 | 25 | 35 | 6 | 16.80 |

EXAMPLE IX

Another series of solid, stabilized hydrogen peroxide-polyvinyl compositions were prepared in order to determine the effect of drying time and hydrogen peroxide concentration of polyvinyl pyrrolidone K–90—hydrogen peroxide samples when varying amounts of 50% hydrogen peroxide are mixed with a constant volume of methanol.

The solid, stabilized compositions were prepared by the following procedure:

35 g. of PVP(K–90) were dissolved in 125 ml. of methanol with stirring until a completely homogenous solution was obtained. The desired amount of 50% $H_2O_2$ was then added and stirred. This preparation was poured into a Teflon coated cake pan (9" x 9") and placed on the steam bath until a hard, brittle film of PVP (K–90)/$H_2O_2$ was formed. The sample was then removed from the cake pan and ground into small chips with a blender and the percent of hydrogen peroxide in the solid composition evaluated. The results are shown in the following table:

| | $CH_3OH$, ml. | PVP (K–90) gm. | Drying Time In Hours | Percent $H_2O_2$ in PVP (K–90) $H_2O_2$ |
|---|---|---|---|---|
| 50% $H_2O_2$, ml.: | | | | |
| 2 | 125 | 35 | ½ | 3.20 |
| 5 | 125 | 35 | ½ | 6.59 |
| 10 | 125 | 35 | ¾ | 10.43 |
| 15 | 125 | 35 | ¾ | 13.86 |
| 30 | 125 | 35 | ¾ | 18.07 |

Other water-soluble polymeric N-vinyl heterocyclic compounds may be used in the above examples instead of polyvinyl-pyrrolidone. Such materials include poly-N-vinyl-2-oxazolidone, poly-N-vinyl imidazole, poly-N-vinyl-3-morpholones, copolymers of N-vinyl-2-pyrrolidone and vinyl acetate, copolymers of N-vinyl-2-pyrrolidone and styrene, copolymers of N-vinyl-2-pyrrolidone and vinyl chloride, copolymers of N-vinyl-2-pyrrolidone and methyl vinyl ether or the like. It is to be understood that monomers of other N-vinyl lactams, N-vinyl oxazolidones, N-vinyl imidazoles, N-vinyl morpholones, or the like may be used in the preparation of the above copolymers. The above described copolymers may be random type copolymers, graft copolymers or the like.

I claim:

1. A solid stabilized composition consisting essentially of hydrogen peroxide and a stabilizing amount of a water-soluble polymeric-N-vinyl heterocyclic compound selected from the group consisting of water-soluble homopolymers of N-vinyl-2-pyrrolidone, N-vinyl-2-oxazolidone, N-vinyl imidazole, N-vinyl-3-morpholone, and water-soluble copolymers thereof with vinyl acetate, styrene, vinyl chloride, and methyl vinyl ether, wherein the amount of hydrogen peroxide present is at least 2% by weight based on the weight of polymeric vinyl heterocyclic compound in the product.

2. A solid stabilized composition as defined in claim 1, wherein the polymeric N-vinyl heterocyclic compound is poly-N-vinyl-2-pyrrolidone.

3. A process for preparing a solid stabilized composition as defined in claim 1, which comprises drying an aqueous solution of hydrogen peroxide and a water-soluble polymeric-N-vinyl heterocyclic compound selected from the group consisting of water-soluble homopolymers of N-vinyl-2-pyrrolidone, N-vinyl-2-oxazolidone, N-vinyl imidazole, N-vinyl-3-morpholone, and water-soluble copolymers thereof with vinyl acetate, styrene, vinyl chloride, and methyl vinyl ether.

4. A process as defined in claim 3, wherein the polymeric N-vinyl heterocyclic compound is poly-N-vinyl-2-pyrrolidone.

5. A solid stabilized composition as defined in claim 1, wherein the amount of hydrogen peroxide present is from about 4.5% to about 70% by weight.

References Cited
UNITED STATES PATENTS 3,376,110  4/1968  Shiraeff _____ 23—207.5

LEON D. ROSDOL, Primary Examiner

I. GLUCK, Assistant Examiner

U.S. Cl. X.R.

8—111; 23—207.5; 252—102, 401, 403